United States Patent [19]

Blonder et al.

[11] Patent Number: 4,617,608

[45] Date of Patent: Oct. 14, 1986

[54] VARIABLE GAP DEVICE AND METHOD OF MANUFACTURE

[75] Inventors: Greg E. Blonder, Maplewood; Angelo A. Lamola, Warren; Robert A. Lieberman, New Providence, all of N.J.

[73] Assignee: AT&T Bell Laboratories, Murray Hill, N.J.

[21] Appl. No.: 744,382

[22] Filed: Jun. 13, 1985

Related U.S. Application Data

[63] Continuation-in-part of Ser. No. 687,192, Dec. 28, 1984, abandoned.

[51] Int. Cl.⁴ .................. H01G 5/18; H01G 7/00; G01L 9/00
[52] U.S. Cl. .................. 361/291; 29/25.42; 73/705
[58] Field of Search ............ 361/280, 283, 287, 290, 361/291; 29/25.42, 588; 250/231 P; 73/705, 717

[56] References Cited

U.S. PATENT DOCUMENTS

| | | | |
|---|---|---|---|
| 2,576,489 | 11/1951 | Stovall | 361/280 |
| 2,868,894 | 1/1959 | Schultz | 361/283 X |
| 3,426,209 | 2/1969 | Sihvonen et al. | 361/280 X |
| 3,782,486 | 1/1974 | Kuhn et al. | 361/290 X |
| 4,017,495 | 4/1977 | Jaffe et al. | 29/588 X |
| 4,151,578 | 4/1979 | Bell | 361/283 |
| 4,158,310 | 6/1979 | Ho | 73/705 |
| 4,217,623 | 8/1980 | Nishino et al. | 361/280 |
| 4,368,645 | 1/1983 | Glenn et al. | 73/705 |

OTHER PUBLICATIONS

J. W. Berthold et al., "Fiber Optic Method for Sensing Diaphragm Deflection", *SPIE Proceedings*, vol. 412, pp. 90–95, (1983).

F. P. Milanovich, "Process, Product and Waste Stream Monitoring with Fiber Optics", *ISA International Conference Preprint*, pp. 407–418, (1983).

*Primary Examiner*—Donald A. Griffin
*Attorney, Agent, or Firm*—Lester H. Birnbaum

[57] ABSTRACT

A variable gap device which comprises a suitable material with a cavity formed therein mounted over a body. Elements are formed on the surface of the body and on the top surface of the cavity. In one embodiment, the elements are electrodes of a variable capacitance device, and in another embodiment the elements are partial or total reflectors of incident light from an optical fiber. The surface of the cavity opposite the body is preferably flat and of the order of microns from the body.

The device is fabricated by forming a removable layer over a temporary substrate. An appropriate element pattern is formed over the removable layer and the layer is etched in a configuration which will define the cavity. The deformable material is encapsulated over this structure and then removed from the substrate with the element remaining in the cavity. Any removable material remaining in the cavity can then be etched away.

29 Claims, 22 Drawing Figures

VARIABLE GAP DEVICE AND METHOD OF MANUFACTURE

CROSS-REFERENCE TO RELATED APPLICATIONS

This application is a continuation-in-part of U.S. Pat. application Ser. No. 687,192, filed Dec. 28, 1984, assigned to the present assignee and now abandoned.

BACKGROUND OF THE INVENTION

This invention relates to variable gap devices and their method of manufacture.

Variable gap devices are those which include a pair of elements and a deformable material which permits a variation in the gap between elements. In the case of variable capacitance devices, the elements are electrodes which form a capacitor. When a bias is supplied to the electrodes, the variable capacitance may be used for a wide variety of functions. For example, the deformable material may take the form of a membrane which is coupled to an electrode and displaced in response to a pressure or audio input. The variation in capacitance resulting from the change in electrode gap can be detected, and the device functions as a pressure sensor or microphone, respectively. By applying a varying bias to the electrodes, the membrane can be caused to vibrate, and the device functions as a loudspeaker or hearing aid. (See, for example, U.S. Pat. application of Busch-Vishniac et al, Ser. No. 572,683, filed Jan 20, 1984 and assigned to Bell Telephone Laboratories now U.S. Pat. No. 4,558,184 issued Dec. 10, 1985.) Other types of variable capacitance devices make use of a flexible reflecting electrode for controlling optical interference in order to provide a display function. (See, e.g., European Patent Application Publication No. 0035299, published Sept. 9, 1981.) A still further type of device employs a deformable waveguide between two electrodes such that electrostatic attraction deforms the waveguide and attenuates light propagation therethrough. A plurality of such devices forms an optical image recorder (see, e.g., U.S. Pat. No. 4,162,118, issued to Conwell).

While devices presently available may be adequate, the need exists for a variable capacitance device which can operate at low voltages. Further, precise sensor or display operations require a highly uniform gap distance. The device should also be compact in order to be compatible with the microminiature nature of operations such as blood pressure sensors and the like.

In addition to achieving devices of the abovedescribed nature, it is desirable to provide an economical method for fabricating such devices with precise dimensions in large quantities. This requires a technique which is capable of forming gaps of the order of microns and extremely flat surfaces in a reproducible fashion. Fine-line electrode dimensions approximately 20 μm in width are also desirable for many applications. Present techniques typically require difficult alignment and etching techniques which are not readily compatible with extremely small gap dimensions.

Consequently, it is an object of the invention to provide variable gap devices which are small and highly accurate, yet can be manufactured inexpensively on a large scale. It is a further object of the invention to provide a method of manufacturing such devices.

SUMMARY OF THE INVENTION

These and other objects are achieved in accordance with the invention which, in one aspect, is a variable gap device comprising a first body including a first element formed on one surface thereof and a second body mounted to the first body. The second body includes a cavity formed therein with a surface positioned opposite the first element and a second element formed on this surface to form a gap between the elements. At least one of the bodies is flexible so that the body can be deformed and the gap between elements can be varied. The gap in the undeformed state is not greater than 30 μm.

In accordance with a further aspect, the invention is a method of fabricating a variable gap device. A removable layer is formed over a substrate, and an element is formed over the removable layer. Portions of the removable layer which are not covered by the element are removed. A material is formed over the substrate so as to encapsulate the element and the remaining portion of the removable layer thereunder. The material is then separated from the substrate, and the remaining portion of the removable layer is removed so that a cavity is formed in the material with the element adhering to the bottom surface of the cavity.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
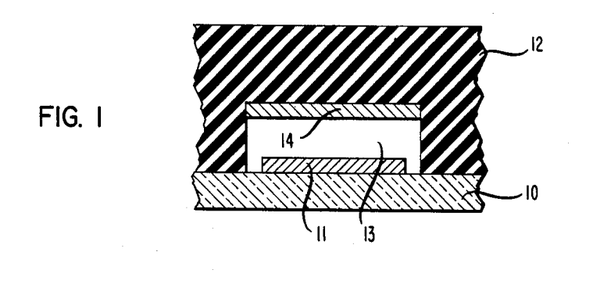
FIG. 1 is a cross-sectional view of a device in accordance with one embodiment of the structural aspects of the invention.

FIG. 1 illustrates, in cross section, a basic form of the invention. A substrate, 10, which in this example was glass, included on one major surface an element, 11, which comprised chromium. A sheet of rubber, 12, with a small inset cavity, 13, was formed over the substrate so that the cavity overlaid the element, 11. The cavity, 13, included an element, 14, formed on the top surface of the cavity so that it was encased on five sides by the rubber, 12.

The rubber was chosen to have a strong van der Waals attraction so that it would adhere to the substrate without chemically bonding thereto. In this example, the rubber was sold by Dow Corning under the designation Sylgard 184, but other flexible materials may be employed as long as they are compatible with the fabrication technique employed to be described. It is also desirable that any such material adhere to the substrate, but some bonding medium could be employed for this purpose if the material did not exhibit van der Waals attraction. The material of element, 14, in this example was aluminum and that of element, 11, was chrome, but any reflecting or conductive material could be employed, depending upon the function of the device.

It will be appreciated that when an external bias (not shown) is applied to the elements, 11 and 14, the structure operates as a variable capacitance device since the rubber material, 12, permits element, 14, to move either as a result of an attractive potential applied to the elements or as a result of some outside pressure applied to the rubber material. It will also be appreciated that, alternatively, the device of FIG. 1 can be made with a stiff material instead of the rubber, 12, and a flexible membrane provided in place of substrate, 10. In that embodiment, the element, 11, would move while the element, 14, would be stationary during operation. (Hereinafter, whenever it is intended to apply a bias to elements, 11 and 14, they will be described as "electrodes".)

Typically, for a pressure sensor, the external bias would comprise an AC source and a resistor so as to form an RC circuit with the device of FIG. 1. The maximum voltage across the resistor will be determined by the resonance of the circuit which in turn is a function of the capacitance of the device. Thus, changes in capacitance can be detected by changes in the position of maximum voltage as known in the art. (See, for example, *The Art of Electronics*, by Horowitz and Hill, Cambridge University Press, 1980.) Alternatively, a DC potential could be supplied and changes in capacitance determined by measuring changes in the charge on the electrodes. A distributed array of such sensors could be used as a tactile sensor for a robot.

One of the unique features of the structure is the fact that the height of the cavity, 13, is made so small that the gap between electrodes, 11 and 14, permits operation of the device with an extremely small potential. In this example, the gap between electrodes was only approximately 1 $\mu$m, and the thickness of the electrodes was also approximately 1 $\mu$m. The width of the cavity (and electrode, 14) was approximately 1 mm, while the width of electrode, 11, was 0.9 mm. (The electrodes and cavity were square.) The rubber, 12, was approximately 1 mm thick. With these dimensions, the device may be operated at an applied AC voltage of, typically, 5-10 volts for electrostatic movement of the electrodes and be sensitive to pressures of approximately 0.01 psi at less than 1 volt for sensing operations where the electrodes are moved by outside mechanical forces. In order to keep the operating voltage low, it is generally desirable to have an electrode gap in the undeformed state of no greater than 10 $\mu$m for electrostatic movement of the electrodes and no greater than 30 $\mu$m for mechanical movement.

A further unique and desirable feature is the fact that the surface of the cavity including the element, 14, can be essentially flat so that the capacitance or reflectivity of the device is highly uniform across the electrodes. This is especially important when very sensitive measurements are required, such as in monitoring blood pressure, and when the device is used for display purposes in the manner described subsequently.

FIGS. 2-6 illustrate, in cross section, a sequence of steps utilized to fabricate the device of FIG. 1 in accordance with one embodiment of the method of the invention where the elements 11 and 14 are electrodes. (In these and subsequent figures, elements corresponding to those in FIG. 1 are similarly numbered.) While a single device is shown, it should be appreciated that several devices can be batch-fabricated in accordance with the method.

Figure 2:
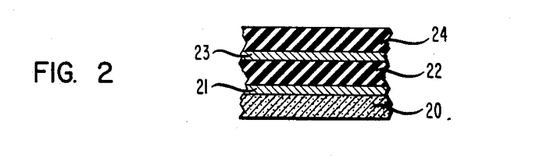
FIGS. 2–6 are cross-sectional views of a device in various stages of fabrication in accordance with one embodiment of the method aspects of the invention.

As shown in FIG. 2, the method employs a temporary substrate, 20, which in this example was a silicon wafer but could be any substrate which is flat and generally free from imperfections. A glass sheet, for example, could also be utilized. Formed over the substrate was a layer, 21, which is characterized herein as a "parting layer" since it was subsequently used to separate a portion of the device from the substrate. Several types of parting layers may be employed. In this example, the parting layer was magnesium which was deposited by thermal evaporation to a thickness of approximately 3000 Angstroms so that the device can be separated by a galvanic coupling action. It may also be desirable to choose layers which will dissolve in a chemical or electrochemical etch to cause separation.

If desired, the "parting layer" could comprise an entire substrate which is dissolvable in some etchant so as not to affect the remaining portion of the device.

After the parting layer, 21, was deposited, a removable layer, 22, was formed thereon. In this example, the layer was a photoresist sold by Shipley Corporation under the designation AZ1450J. However, any standard photoresist or other material which can be etched or dissolved in accordance with the method can be employed. The thickness of this layer will determine the electrode gap. Consequently, the thickness in this example was approximately 1 $\mu$m.

Figure 3:
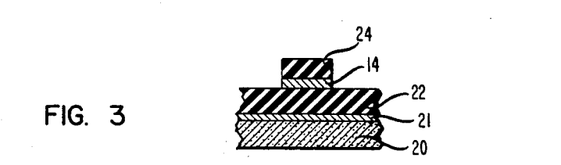

Next, an electrode pattern was defined over the photoresist. The pattern could be formed, for example, by depositing through a stencil mask. In this example, however, which required fine-line definition, the electrode was defined by first depositing a layer of metal, 23, in this case aluminum, over the entire substrate. The thickness of the layer was approximately 1 $\mu$m. The metal was then covered by a second photoresist layer, 24, which may be identical to the first photoresist layer. As illustrated in FIG. 3, the electrode was then defined by standard photolithography involving exposing the layer, 24, through a mask (not shown) and developing the resist so that it remained over the portion, 14, of the metal film, 23, which will comprise the electrode. The exposed portion of layer, 23, was then etched, for example, by a phosphoric acid based etch to define the electrode.

Figure 4:
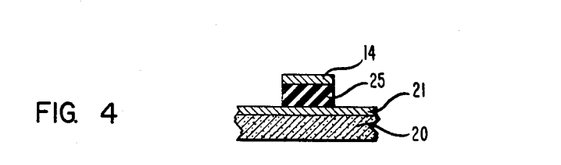

As illustrated in FIG. 4, all of the exposed photoresist (layers, 22 and 24) was then removed leaving the electrode, 14, over a portion, 25, of the photoresist layer, 22. This removal was accomplished by standard plasma etching employing an oxygen plasma, but other techniques could be employed.

Figure 5:
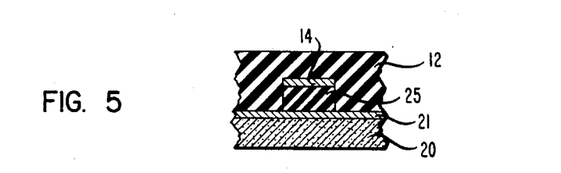
Figure 6:
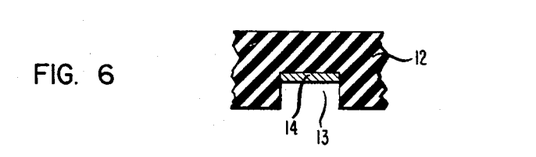

In the next step, as illustrated in FIG. 5, the rubber material, 12, was applied over the substrate so as to encapsulate the electrode, 14, and the remaining photoresist portion, 25. In this example, the rubber was poured over the substrate and allowed to cure at room temperature for approximately 24 hours. Such room temperature curing is preferred since there is essentially no shrinkage of the rubber which would wrinkle the top surface of the cavity and the electrode, 14. Thus, the flat surfaces ultimately result in a uniform capacitance in the final device. However, higher temperature cures may be appropriate for certain applications.

The structure of FIG. 5 was then immersed in some solution which separates the rubber, 12, along with the electrode, 14, and the photoresist, 25, from the temporary substrate, 20, along the parting layer, 21. As mentioned previously, separation was accomplished by galvanic coupling. That is, when two dissimilar metals in electrical contact are placed in a bath where electrons are available, the metal which gives up ions will corrode while the metal which gives up electrons remains essentially unchanged. In this example, the magnesium layer, 21, acted as the corroding metal and the substrate, 20, acted as the noncorroding metal when the structure was immersed in a bath of HC1. The rubber parted from the substrate, typically, in approximately 30 minutes.

Any remaining photoresist portion, 25, was removed subsequently from under the electrode, 14, for example, by rinsing in acetone followed by isopropyl alcohol. This leaves the structure shown in FIG. 6 where the cavity, 13, with electrode, 14, on the top surface was formed in the rubber material. If desired, the portion, 25, could be removed at the same time as the parting of the rubber from the substrate by including in the bath a material which also dissolves the layer, 25.

The electrode, 11, (see FIG. 1) was formed on the permanent substrate, 10, by chrome thermal evaporation followed by standard photolithography. The cavity from the structure of FIG. 6 was then aligned with the substrate electrode and the rubber made to contact the substrate surface. Since the rubber adheres well to most surfaces by van der Waals attraction, only slight pressure is needed to cause the rubber to adhere to the substrate. One of the advantages of the rubber is that it will adjust itself to conform to imperfections or to ride over electrode interconnections on the substrate surface. If desired, the rubber material may be sealed to the substrate by a nubmer of techniques. In this example, the sealing was accomplished by including a wire (not shown) on the substrate around the periphery of the cavity and sending current through the wire to resistively heat the rubber.

Figure 7:
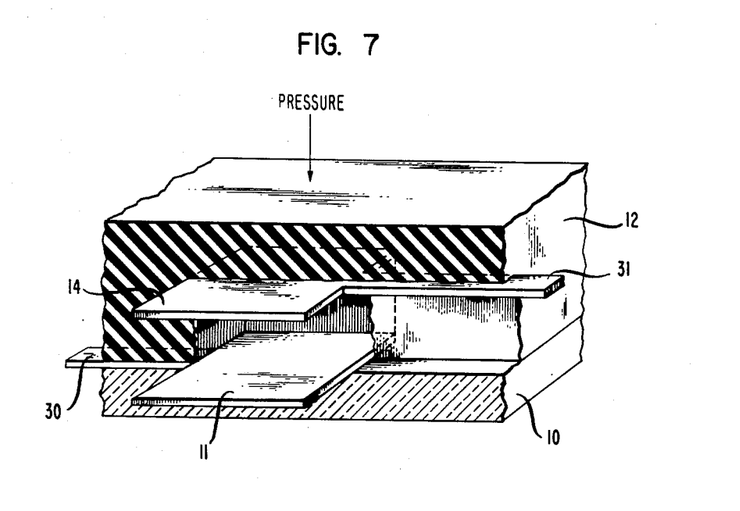
FIGS. 7–9 are partially cut-away perspective views of devices in accordance with further embodiments of the invention.

The device of FIG. 1 can be utilized, for example, as a pressure sensor by providing leads to the top and bottom electrodes, 14 and 11, during the electrode definition step (FIG. 3) and applying an external AC or DC bias. Any change in capacitance as a result of moving electrode, 14, due to pressure can be detected as previously described. As shown in FIG. 7, which shows the rubber, 12, partially cut away, the lead, 30, to the bottom electrode could be formed on the substrate, 10, and the lead, 31, to the top electrode can be formed along the top surface of the cavity. (The cavity is therefore extended in the area under the lead, 31, and would have a reduced width corresponding to that of the lead in the extended area, less any undercutting of layer, 25, which occurred during the plasma etching.) The leads may be formed orthogonally if desired. The same device could be used as a pressure switch which is turned on only when the two electrodes, 11 and 14, make contact.

An array of devices such as shown in FIG. 7 formed in the same rubber material, 12, can be utilized as a touch screen as long as the rubber and electrodes are transparent or they obscure only a small fraction of the viewing area.

Figure 8:
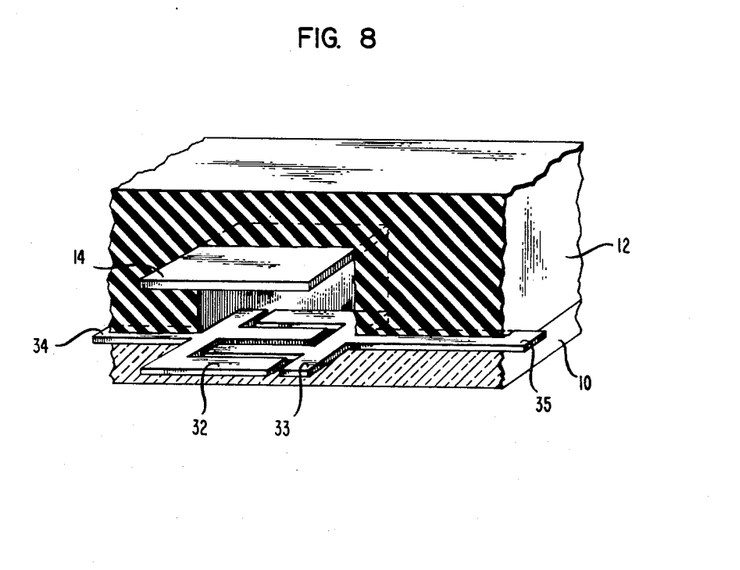

As an alternative to providing leads on the top surface of a cavity, the structure shown in FIG. 8 may be utilized. Here, the bottom electrode is replaced by two interdigitated electrodes, 32 and 33, each with a lead, 34 and 35, formed on the substrate. Each lead electrically connects its corresponding electrode to a bias (not shown). The two electrodes, 32 and 33, are therefore capacitively coupled through the top electrode and can sense the position of the top electrode without any leads applied thereto. Further, the device may be operated even if cracks develop in the top electrode since the AC capacitance would not be affected.

It will also be appreciated that the devices shown in FIGS. 7 and 8 can be operated as speakers or microphones with the appropriate potential applied to the electrode.

Figure 9:
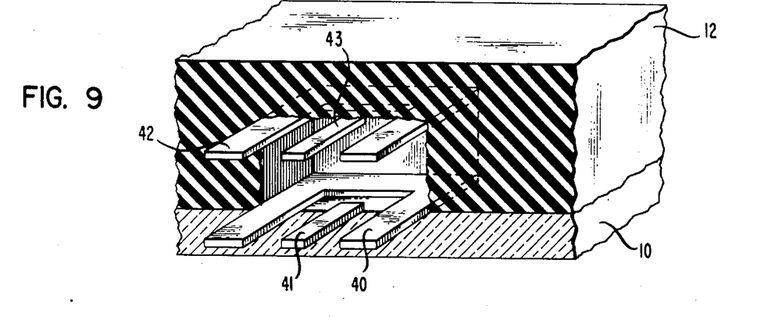

A further variation in electrode shape results in the high impedance switch illustrated in FIG. 9. Both top and bottom electrodes comprise a U-shaped portion, 40 and 42, and an electrically isolated switch contact portion, 41 and 43. (Leads coupled to these electrodes are not shown in this figure for the sake of simplicity.) An attractive potential applied between U-shaped portions, 40 and 42, pulls down the top electrode allowing the switch contacts, 41 and 43, which are electrically isolated from the U-shaped portions, to come in contact and close whatever circuit is coupled to these contacts. Thus, an electrostatic relay with high electrical isolation and requiring low power can be produced.

Figure 10:
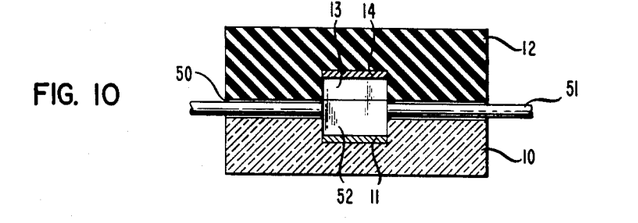
FIGS. 10–12 are cross-sectional views of devices according to still further embodiments of the invention.

As illustrated in FIG. 10, the variable capacitance device may also be used as a low frequency optical switch. Here, two optical fibers, 50 and 51, are provided in alignment grooves in the substrate, 10, with the air cavity, 13, between the fiber ends. In this example, a well, 52, is also provided in the substrate. An optical matching fluid could be provided in the area of the cavity and well to improve coupling. In its undeformed state, light would be coupled between the fibers. When a sufficiently attractive voltage is supplied to the electrodes, 11 and 14, the deformed rubber material, which is opaque, would be interposed between the fibers to block the coupling therebetween.

Figure 11:
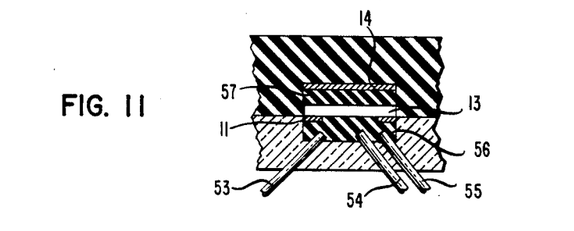

A different form of optical switch is shown in FIG. 11. An input fiber, 53, and two output fibers, 54 and 55, are provided through the substrate, 10, so that their ends extend into the well, 52. The well, 52, and a portion of the cavity, 13, are provided with an optical matching material, 56 and 57, respectively. The index of refraction of the optical matching material is chosen so that, in the device's undeformed state, the light from input fiber, 53, will be totally internally reflected at the surface of the matching material, 56, so as to be incident on optical fiber, 54. When a sufficiently attractive voltage is applied between electrodes, 11 and 14, the space between the optical matching materials, 56 and 57, will be eliminated so that the light will no longer be reflected at the surface of material, 56, but will continue to the electrode, 14. The light will be reflected by this electrode and be incident on output fiber, 55, thereby switching the light output between the output fibers.

Figure 12:
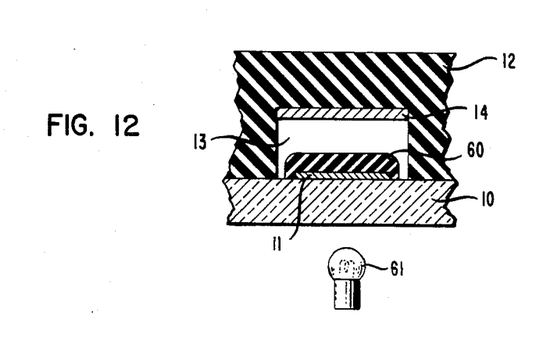

The device may also be used as a display, a basic form of which is illustrated in FIG. 12. In addition to the components previously described, this device may include a layer of insulating material, 60, formed over the bottom electrode. In this particular example, the layer was silicon dioxide having a thickness of approximately 500 Angstroms. The top electrode, 14, was reflecting and had a thickness of approximately 1 $\mu$m. The bottom electrode, 11, was made from a semi-transparent material, in this case chrome, and was approximately 60 Angstroms thick. The substrate, 10, was transparent and in this example was glass.

In operation, light from a source, 61, such as ordinary ambient light, will be incident on the substrate and be paritally reflected at all interfaces where there is a change in index of refraction and fully reflected by electrode, 14. In the undeformed state, the optical interference between the reflected rays will be relatively weak due to the wide air cavity, 13. Reflected light which emerges from the substrate will therefore have a grayish color. When a sufficiently attractive voltage, in this example approximately 15 volts, is applied to electrodes, 11 and 14, the electrode, 14, will be brought into contact with insulating layer, 60. This eliminates the air cavity and causes a strong interference effect among light reflected by electrode, 11, layer, 60, and by electrode, 14. A bright, intense color is therefore produced by the reflected light at a wavelength dependent upon the thickness of the bottom electrode and the $SiO_2$ layer. In this example, the color of the display was purple.

Thus, each air cavity and electrode pair formed in material, 12, can comprise a segment of a numeric or alpha numeric display. If desired, a filter could be provided to filter out the gray color when the segment is in its undeformed (off) state. The top electrode could also be made semi-transparent and a light source provided above that electrode to produce a back-lit display operating by transmissive rather than reflective interference. Further, an interdigitated bottom electrode, such as that shown in FIG. 8, could be employed. A high impedance switch, for example the type shown in FIG. 9, can also be incorporated into each display segment if it is desirable to have the segment remain on after the voltage is removed. That is, the high impedance when the switch is opened causes the capacitor to remain charged for a period of time after the bias to the segment is removed, thus providing a latching phenomenon.

Figure 13:
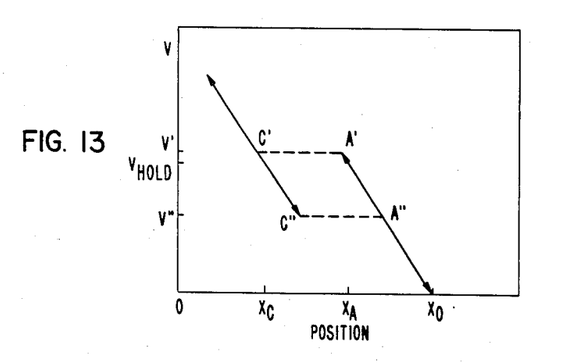
FIG. 13 is an illustration of voltage as a function of electrode position for a device operated in accordance with a still further embodiment.

It is also possible to design a display which, at a particular voltage, has two stable modes, thereby eliminating the requirement of a separate switch for each segment if latching is desired. A display can therefore be made to operate according to the hysteresis plot of FIG. 13. Here, $X_o$ is the displacement of the electrodes in the undeformed state. A bias of $V = V_{hold}$ is applied to each display segment to deform the device to produce a gap of $X_A$. For a desired segment to be turned "on", a voltage of $V > V'$ would be applied to cause an electrode separation of $X < X_C$. When this additional voltage is removed, the position of the electrodes is returned to $X = X_C$ rather than $X_A$, thus establishing a bistable mode. In order to turn all segments "off", the voltage is set to zero and all the electrode gaps return to $X = X_o$.

Figure 14:
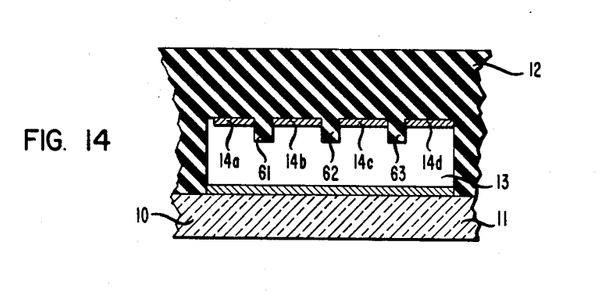
FIG. 14 is a cross-sectional view of a device which can be operated in accordance with FIG. 13.
Figure 15:
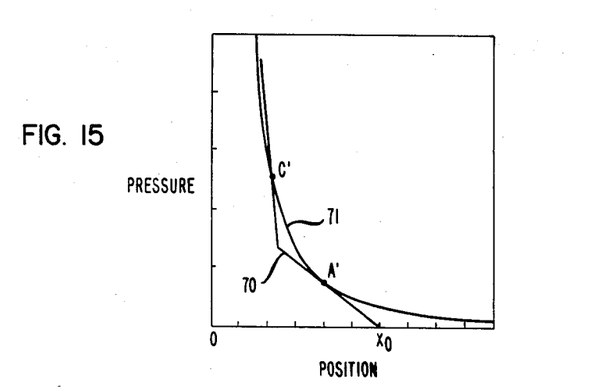
FIGS. 15 and 16 are illustrations of pressure as a function of electrode position for the device of FIG. 14.
Figure 16:
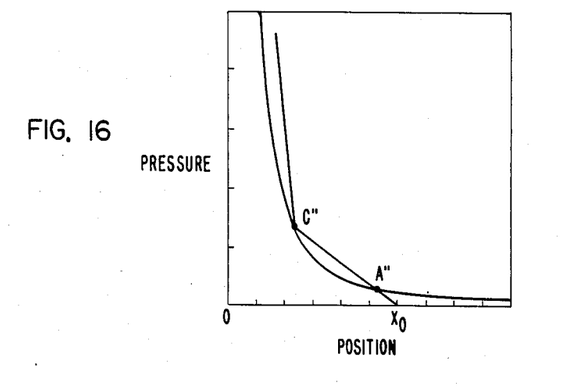

One example of a structure which can be operated in such a manner is illustrated in FIG. 14. In this example, which illustrates a single display segment, the top electrode is broken into portions 14a–14d and interspersed between the portions are stubs, 61–63, which are formed from the rubber material, 12. Initially, the displacement of the rubber, 12, as a function of pressure will be linear according to Hooke's Law. Once the stubs make contact with the lower electrode, 11, the pressure versus displacement curve will experience a sharp change in slope due to the resistance provided by the stubs against further displacement. FIG. 15 illustrates the resulting pressure versus displacement curve, 70, along with the capacitance curve, 71, which indicates how much pressure is needed to keep the electrodes from coming together when an attractive potential of V' is applied thereto. As shown, these curves intersect at point A' and C' which are the two stable states for the particular voltage applied to the electrodes. As shown in FIG. 16, when the voltage is lowered to V", the stable states become A" and C". Thus, operation in accordance with the hysteresis loop of FIG. 13, previously described, can be achieved.

Figure 17:
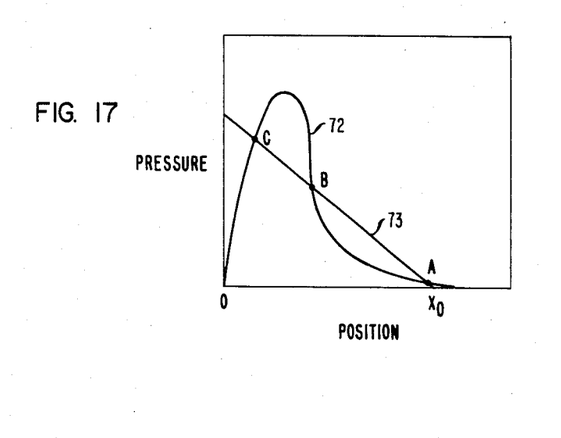
FIG. 17 is an illustration of pressure as a function of electrode position for yet another embodiment of the invention.

An alternative way of achieving bistable modes is to vary the shape of the capacitance curve rather than the mechanical curve. In FIG. 17, for example, the curve, 73, is the normal linear Hooke's Law displacement curve. Curve, 72, is the capacitance curve which represents the case of interdigitated electrodes being pulled into a parallel plane. Points A and C are stable for such a configuration.

Figure 18:
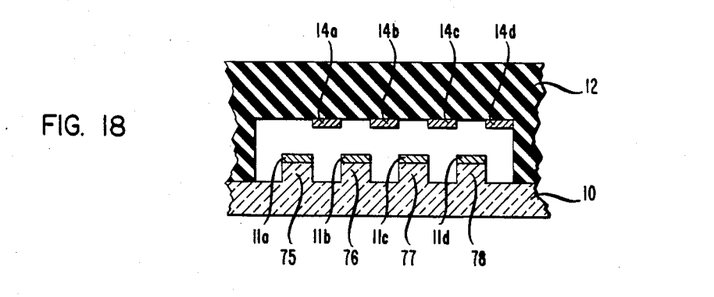
FIG. 18 is a cross-sectional view of a device which exhibits the characteristics of FIG. 17.

One embodiment which is capable of achieving such pressure versus position curves is illustrated in FIG. 18. Here, again the top electrode is divided into portions, 14a–14d. However, the bottom electrode is also divided into portions, 11a–11d, which, optimally, are disposed on pedestals, 75–78, fabricated from the substrate, 10. The bottom electrode portions are displaced from the top electrode portions so that the top portions move in the area between the bottom portions when the device is deformed. The device therefore takes advantage of the fringing fields between top and bottom electrode portions to produce the irregular capacitance curve of FIG. 17.

While the previous examples have all involved operation of the inventive device by applying an external bias to elements, 11 and 14, it is also possible to utilize the device with a purely optical address and readout. As illustrated, for example, in FIG. 19, an optical fiber sensor can be fabricated since the inventive device can be made small enough to fit on the end of a fiber, 80. The fiber protective coating, 90, was stripped from the end portion of the fiber and replaced with hypodermic tubing, 91. Element, 11, which was a layer of chrome having a thickness of approximately 70 Angstroms in this example, was deposited on the end of the fiber and tubing by thermal evaporation. The remainder of the device was fabricated as previously described, with element, 14, encased in rubber, 12. Element, 14, was, again, aluminum with a thickness of approximately 1 $\mu$m, but had an area approximately corresponding to that of the fiber core, 81, which in this example was a 50 $\mu$m diameter circle. The dimensions of the rubber, 12, were 0.2 mm thick and 0.5 mm in diameter. The portion including the element, 14, and rubber, 12, was then mounted on the fiber end so that element, 14, was in alignment with the fiber core, 81. Additional hypodermic tubing, 92 and 93, was provided around the rubber, 12, and original tubing, 91, for added strength. The remainder of the volume defined by tubing, 93, not occupied by rubber, 12, was filled with an appropriate filler material, 94, such as silicone.

The air gap, 13, between elements, 11 and 14, in the undeformed state was, again, approximately 1 μm. This gap will vary due to changes in outside pressure. The structure of FIG. 19 can therefore be utilized, for example, as a blood pressure sensor by sending light from a source (not shown) through the fiber core, 81, so that the light is partially reflected by element, 11, and totally reflected by element, 14. The reflected light will form an interference pattern returning through the fiber core. Since the interference pattern will be dependent upon the gap distance, pressure can be monitored by detecting changes in light intensity for one or more wavelengths of the incident light. (For a more detailed discussion of the readout of a fiber optic sensor, see U.S. Pat. application of S. R. Forrest, R. A. Lieberman, and R. L. Panock, Ser. No. 744,465, filed on June 13, 1985 and assigned to the same assignee.)

Figure 19:
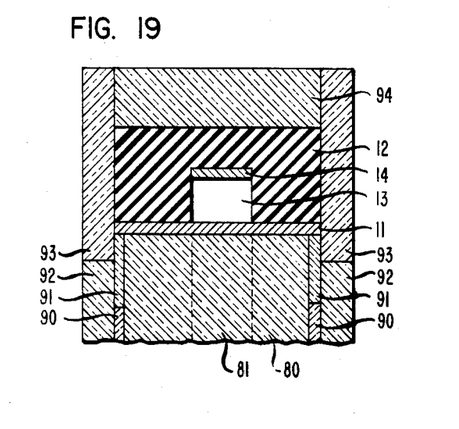
FIGS. 19–22 are cross-sectional views of devices in accordance with still further embodiments of the invention.

The same device depicted in FIG. 19 can also be used as a temperature sensor utilizing the same basic optical addressing and readout scheme. This is because the rubber material, 12, can be made to expand as temperature increases to cause bowing of the reflector, 14, thereby varying the air gap and the interference pattern of the reflected light.

Figure 20:
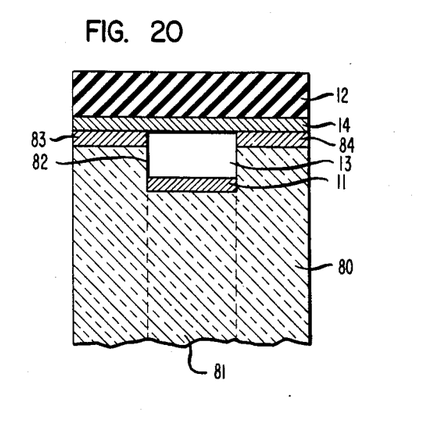

A variation of the optical sensor of FIG. 19 is illustrated in FIG. 20. Here, the gap, 13, between reflecting elements, 11 and 14, is formed by etching a portion of the core, 81, of the fiber, 80, to form a well, 82, in the surface. The partially reflecting element, 11, is then formed by depositing metal over the surface of the fiber including the well (which will also form portions, 83 and 84, on the fiber surface). A suitable flexible material, 12, such as rubber, glass, or silicon, with the fully reflecting element, 14, formed on one surface, is then mounted on the end of the fiber. Appropriate tubing the filler material (not shown) could also be provided. The gap distance is determined by the depth of the well, 82, and thickness of the portions, 83 and 84. Alternatively, the reflecting layer, 11, can be deposited selectively in the well by means of a suitable masking layer such as photoresist.

Figure 21:
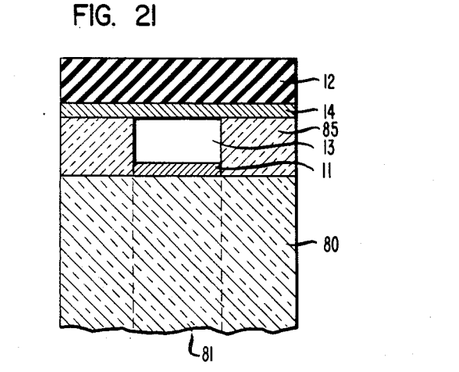

As a further embodiment, illustrated in FIG. 21, a photoresist layer, 85, may be utilized to form the gap between reflecting elements, 11 and 14. This can be the same photoresist which is used to selectively deposit layer, 11, over the fiber core. Alternatively, the layer, 11, could be formed over the entire fiber surface, while the photoresist pillar, 85, is formed over layer, 14, and material, 12, and then the piece part subsequently mounted on the layer, 11.

Figure 22:
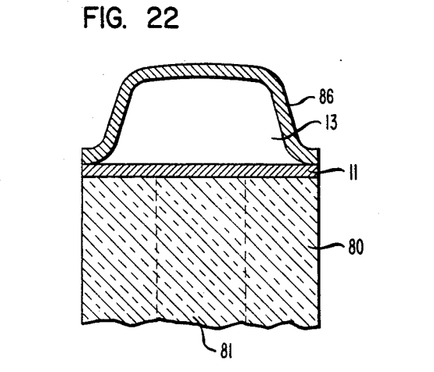

While FIGS. 20 and 21 show possible variations in the pressure sensor, other types of temperature sensors can be fabricated by simply mounting a thick reflecting bridge, 86 of FIG. 22, over a layer, 11, on the fiber surface, including a mound of photoresist (not shown). The photoresist can be dissolved to leave the air gap, 13. The bridge will expand relative to the fiber as temperature is increased, thereby increasing the air gap spacing and changing the reflected interference pattern. The reflecting bridge is typically a metal or plastic which has a higher temperature coefficient than the fiber. Similarly, the reflecting bridge, 86, can be composed of two different layers of material with different thermal expansion coefficients. If only a portion of the bridge is attached to only a portion of layer, 11, the bridge can bend depending upon the temperature, and the gap will again change as a function of temperature.

Various additional modifications of the invention will become apparent to those skilled in the art. All such variations which basically rely on the teachings through which the invention has advanced the art are properly considered within the spirit and scope of the invention.

What is claimed is:

1. A method of fabricating a variable gap device comprising the steps of:
    forming a removable layer over a substrate;
    forming a first element over the removable layer;
    removing portions of the removable layer which are not covered by the element;
    forming a material over the substrate so as to encapsulate the element and the remaining portion of the removable layer thereunder; and
    separating the material from the substrate and removing the remaining portion of the removable layer so as to form a cavity in the material with the element adhering to the top surface of the cavity.

2. The method according to claim 1 wherein the removable layer comprises a photoresist material.

3. The method according to claim 1 wherein the material which encapsulates the element comprises a rubber material.

4. The method according to claim 3 further comprising the step of mounting the material with the cavity and element formed therein over a substrate which includes a second element so that the cavity is aligned over the second element.

5. The method according to claim 4 wherein the material is made to adhere to the substrate surface by means of van der Waals attraction.

6. The method according to claim 4 wherein the material is sealed to the substrate surface.

7. The method according to claim 1 or 4 wherein the elements are electrodes so as to fabricate a variable capacitance device.

8. The method according to claim 4 wherein the second element is a partially reflecting element and the substrate is an optical fiber.

9. The method according to claim 1 wherein the encapsulating material is separated from the substrate by means of a parting layer formed over the substrate prior to forming the removable layer.

10. The method according to claim 9 wherein the parting layer comprises a metal.

11. The method according to claim 10 wherein the encapsulating material is separated from the substrate by immersing the structure in a bath so that the metal layer is dissolved in the bath.

12. The method according to claim 1 wherein the element is formed over the removable layer by depositing a metal over essentially the entire surface of the removable layer and defining the element photolithographically.

13. The method according to claim 1 wherein the rubber is cured at room temperature.

14. The method according to claim 1 wherein the first element is a totally reflecting element.

15. A variable gap device comprising:
    a first body including a first element formed on one surface thereof;
    a second body mounted to the first body, the said second body including a cavity formed therein which has a surface opposite the said first element;
    a second element formed on said surface of the cavity opposite the first element to form a gap between the elements, at least one of said bodies being flexible so that the body can be deformed and the gap between elements can be varied, while the gap in the undeformed state is no greater than 30 μm; and an optical fiber mounted with respect to the first and second elements so that light from a core of said fiber will be incident on at least a portion of said elements.

16. The device according to claim 15 wherein one of the bodies comprises said optical fiber.

17. The device according to claim 16 wherein one of the elements is a partial reflector of light from the fiber, and the other element is a total reflector of light from the fiber.

18. The device according to claim 15 wherein the first body comprises an optical fiber, the second body is the flexible material, the first element is a partial reflector of light from the fiber, and the second element is a total reflector of light from the fiber.

19. A variable capacitance device comprising:

a first body including a first electrode formed on one surface thereof, said electrode comprising two interdigitated electrode portions which are capacitively coupled together;

a second body mounted over the first body, the said second body including a cavity formed therein which is positioned over said first electrode and which has a surface opposite the said electrode;

at least one of said bodies being flexible so that the body can be deformed and the gap between the said surface of the cavity and the electrode portions can be varied while the gap in the undeformed state is no greater than 30 μm.

20. The device according to claim 19 further comprising a second electrode formed on said surface of the cavity opposite the first electrode so that the interdigitated portions are capacitively coupled together through the second electrode.

21. A variable capacitance device comprising:

a first body including a first electrode formed on one surface thereof;

a second body mounted over the first body, the said second body including a cavity formed therein which is positioned over said first electrode and which has a surface opposite the said electrode;

a second electrode formed on said surface of the cavity opposite the first electrode, at least one of said bodies being flexible so that the body can be deformed and the gap between the electrodes can be varied while the gap in the undeformed state is no greater than 30 μm;

each of said electrodes being u-shaped and surrounding a switch contact electrode electrically isolated therefrom.

22. A variable capacitance device comprising:

a first body including a first electrode formed on one surface thereof;

a second body mounted over the first body, the said second body including a cavity formed therein which is positioned over said first electrode and which has a surface opposite the said electrode;

a second electrode formed on said surface of the cavity opposite the first electrode, at least one of said bodies being flexible so that the body can be deformed and the gap between the electrodes can be varied while the gap in the undeformed state is no greater than 30 μm; and optical fibers formed between the first and second bodies with their ends positioned so that light can be coupled between the fibers while the bodies are undeformed and light is decoupled when one of said bodies is deformed.

23. A variable capacitance device comprising:

a first body including a first electrode formed on one surface thereof;

a second body mounted over the first body, the said second body including a cavity formed therein which is positioned over said first electrode and which has a surface opposite the said electrode;

a second electrode formed on said surface of the cavity opposite the first electrode, at least one of said bodies being flexible so that the body can be deformed and the gap between the electrodes can be varied while the gap in the undeformed state is no greater than 30 μm; and at least three optical fibers formed through one of the bodies with their ends positioned so that light from a first fiber will be coupled to a second fiber when the bodies are undeformed and light from the said first fiber will be coupled to a third fiber when one of the bodies is deformed.

24. A variable capacitance device comprising:

a first body including a first electrode formed on one surface thereof;

a second body mounted over the first body, the said second body including a cavity formed therein which is positioned over said first electrode and which has a surface opposite the said electrode; and a second electrode formed on said surface of the cavity opposite the first electrode, at least one of said bodies being flexible so that the body can be deformed and the gap between the electrodes can be varied while the gap in the undeformed state is no greater than 30 μm;

at least one of the bodies being transparent and at least one electrode being at least semi-transparent so that when light is incident through one of the bodies, the light emerging from the device will have different wavelengths due to interference effects depending upon whether the device is deformed or undeformed.

25. The device according to claim 24 further comprising an insulating layer formed over the first electrode.

26. The device according to claim 24 wherein the device has two stable states when the body is deformed for a particular voltage applied across the electrodes.

27. The device according to claim 26 wherein the second body is flexible and the top electrode includes a plurality of portions which are separated by stubs extending from the second body into the cavity.

28. The device according to claim 26 wherein the first electrode includes a plurality of portions and the second electrode includes a plurality of portions which are disposed to extend in the spaces between the first electrode portions when one of the bodies is deformed.

29. A method of fabricating a variable gap device comprising the steps of:

forming a removable layer over a substrate;

removing portions of the removable layer;

forming a material over the substrate so as to encapsulate the remaining portion of the removable layer; and separating the material from the substrate and removing the remaining portion of the removable layer so as to form a cavity in the material determined by the dimensions of said portion of the removable layer.

* * * * *

Notice of Adverse Decision in Interference

In Interference No. 102,022, involving Patent No. 4,617,608, G. E. Blonder, A. A. Lamola and R. A. Lieberman, VARIABLE GAP DEVICE AND METHOD OF MANUFACTURE, final judgment adverse to the patentees was rendered Oct. 19, 1989, as to claims 15-18.

*[Official Gazette November 21, 1989]*